2,843,638

DEHYDROCHLORINATION OF TETRACHLOROETHANE

Francis W. Theis, Akron, Kenneth W. Richardson, Jr., Barberton, Douglas H. Eisenlohr, West Barberton, and Robert D. Shelton, Barberton, Ohio, assignors to Columbia-Southern Chemical Corporation No Drawing. Application November 15, 1954
Serial No. 469,046

17 Claims. (Cl. 260—654)

The present invention deals with the manufacture of olefinically unsaturated chlorinated hydrocarbons, notably perchloroethylene and trichloroethylene. It relates, more particularly, to vapor phase conversion, particularly by catalytic methods of tetrachloroethane and chlorine to perchloroethylene and/or trichloroethylene.

According to the instant invention, an improved method for preparing perchloroethylene and trichloroethylene is provided. It has now been discovered that among other advantages, minimized by-product formation and efficient conversion to the desired products may be obtained and where a catalyst is used, longer catalyst life achieved by passing a gaseous mixture of tetrachloroethane and chlorine into contact with a first dehydrochlorination zone or bed, effecting substantially complete consumption of the chlorine in said first zone, and passing the resulting mixture through a second reaction zone, e. g. into contact with at least a second catalyst bed or zone wherein dehydrochlorination is effected while preventing the return of any consequential quantity of the mixture in the second bed or zone to the first bed or zone. In normal operation, a continuously forward moving gas stream initially containing tetrachloroethane and chlorine is conducted sequentially through the first catalyst-containing or like reaction zone and thence through at least a second catalyst containing or like reaction zone.

Although the invention is not dependent for its practice upon this theory the conversion of tetrachloroethane to perchloroethylene and trichloroethylene apparently involves three major reactions expressed by the following equations:

(1) 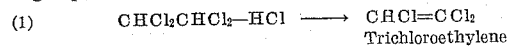
Trichloroethylene (2) 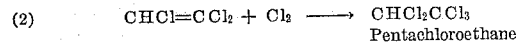
Pentachloroethane (3) 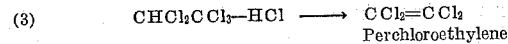
Perchloroethylene Thus, this invention includes conducting the reaction of Equation 2 and thereby consuming essentially all of the charged chlorine in the first catalytic zone. This is an additive chlorination reaction and is exothermic evolving considerable heat. Expressed otherwise this invention involves conducting the primary exothermic reaction of the overall process essentially exclusively in the first of a plurality of catalytic zones and conducting endothermic reactions (such as Reactions 1 and 3) in subsequent zone or zones.

Also occurring in the first catalytic zone are the reactions expressed by Equations 1 and 3. Thus, the final gaseous mixture provided by conducting the contemplated operation in the first reaction zone usually contains substantial quantities of perchloroethylene and trichloroethylene along with some pentachloroethane. Trichloroethylene will be present when the initial chlorine feed is less than that theoretically required to convert all the tetrachloroethane to perchloroethylene, e. g. when less than one mole of chlorine per mole of tetrachloroethane is employed. Also present in the resulting mixture supplied to subsequent zone or zones is unconverted tetrachloroethane. The exact quantity of unconverted tetrachloroethane will vary considerably depending upon the temperature, retention time, activity of the catalyst and relative amount of chlorine initially fed. Usually, between 60 and about 99 percent of the charged tetrachloroethane is converted or used up in the first zone.

Thus, a gaseous mixture containing dehydrochlorinatable materials such as pentachloroethane and/or tetrachloroethane is introduced into the second catalytic zones. It is in the second zone, or subsequent zones, that dehydrochlorination of unconverted tetrachloroethane and any pentachloroethane occurs, notably in the essential absence of feed chlorine. Although not especially desirable, the reaction conditions in the first zone may provide an appreciable quantity of hexachloroethane. By contact with the second catalytic zones, it is possible to at least in part convert the hexachloroethane to product. Frequently, a major portion may be converted.

In the initial catalyst zone, essentially complete consumption of feed chlorine provides a gas stream leaving the zone which contains less than 0.01 mole percent chlorine based on the organic composition of the stream. Thus, even under feed conditions of 0.1 mole chlorine per mole of tetrachloroethane, at least 90 percent of the feed chlorine is consumed. At higher chlorine feeds, the consumption is still greater. Under optimum conditions, the chlorine consumption is 98 to 100 percent.

In conducting this operation, the essential reactants initially fed to the reaction system are symmetrical tetrachloroethane (1,1,2,2-tetrachloroethane) and chlorine. However, other materials may also be present. For example, inerts such as nitrogen which are gaseous under the reaction conditions may be present. Also, trichloroethylene and perchloroethylene may be included in the feed, although under preferable operating conditions, this is not recommended.

The tetrachloroethane usually employed is that produced by catalytic chlorination of acetylene and likely contains minor amounts of other products encountered in such preparation. Consequently, minor concentrations of less than 1 percent and most frequently on the order of from 0.1 percent of pentachloroethane, trichloroethylene, acetylene dichloride and hexachloroethane by weight of the tetrachloroethane may be included and are not particularly deleterious. Absence of detectible quantities of any substitution chlorination catalyst, notably ferric chloride, employed in the chlorination of acetylene to provide the tetrachloroethane is necessary. Tetrachloroethane prepared by processes other than acetylene chlorination is suitable.

Catalysts which are effective may be characterized as dehydrochlorination catalysts, exemplified by barium chloride, a preferred catalyst. Each of the catalytic beds comprises such a dehydrochlorination catalyst. Catalysts include metal chlorides among others, strontium chloride, cadmium chloride, copper chloride, magnesium chloride, and other salts of bivalent metals. In use, these catalysts are most effective when supported on a porous solid carrier such as is provided by impregnation of porous, finely divided carbon or like materials with a solution of the listed compounds.

The actual bed of such catalysts comprises a gas pervious mass of the impregnated or otherwise treated porous solid carrier in the form of finely divided particles. It has been found that catalyst particles initially having a particle size of from 1 to 20 mesh are most satisfactory, mainly for physical reasons, e. g. handling the bed and minimizing the possibilities of fines becoming entrained in the gas stream.

It will be appreciated that various types of apparatus may be employed. As pointed out already, one of the important features of the present process is the establishment of a continuously forwardly moving stream of the gaseous mixture. Thus, reactors which admit of such procedure are employed. In particular, it has been found especially advantageous to employ elongated catalyst containers. This permits provision of a single line of flow for the gaseous reaction mixture as it passes through the catalytic bed, which flow is especially suitable. Tubular catalyst beds, which have a maximum cross-sectional diameter of about 3 inches, and preferably no greater than 1 to 2 inches have been found effective. Containers which are at least 3 feet in length along the line of flow are most suitable. Thus, the first container is at least 3 feet long and may range up to about 10 or 12 feet. The second container providing a second zone, in the case of two physically distinct zones should also be at least 3 feet long, but may be considerably longer, e. g. 10 or 12 feet. Usually, a zone of a minimum of 6 feet along the line of flow is employed.

Individual catalyst containers may be grouped parallelly so as to be served by a single heat transfer medium and feed means. For example, a plurality of tubes may be parallelly anchored as headers at their inlet and outlet ends and surrounded by a single body of heat transfer medium.

A number of processes coming within the purview of this invention may be practiced in accordance with the technique using a plurality of reaction zones wherein essentially all of the charged chlorine is consumed in the first said reaction zone, and the gaseous mixture emanating from the first reaction zone and passed through subsequent reaction zones is not returned to the first reaction zone. Somewhat different conditions are optimum for the specific processes comprising the available alternatives. However, the same general conditions may be applied in the obtention of acceptable results.

Thus, the temperature in the first catalytic zone is maintained between about 400° F. and 700° F. and more particularly between 450° F. and 600° F. In the second zone and subsequent zones if used, the temperatures are between about 400° F. and 700° F.

Retention times within the first zone range from about 1.0 to 10 seconds and are preferably limited to between 3 and 6 seconds. In the subsequent catalyst zone, other than the first, the retention time is not as critical and may be more widely varied. A minimum overall retention time in the one or more catalyst zones subsequent to the first of about 6 seconds is recommended. Substantially longer retention times up to 15 or 20 seconds or even longer are not particularly disadvantageous to the reactions; however, the excess retention time over between 6 to 10 seconds in the subsequent catalyst zones after the first is not generally responsible for any consequential improvement.

For the purposes of this invention, it is possible to divide the contemplated processes coming within the purview thereof, into two operations on the basis of their respective chlorine feed requirements.

In one of these general reactions, comparatively small quantities of chlorine are charged based on the tetrachloroethane. This process is primarily directed to the preparation of trichloroethylene as the major product with lesser quantities of perchloroethylene. Thus, when the primary product is to be trichloroethylene between 0.1 to 0.4 mole of chlorine per mole of tetrachloroethane is fed to the first reaction zone. Under these feed conditions, the temperature in the first reaction zone is maintained between about 460° F. and 600° F. The subsequent catalytic zones are maintained at temperatures between 450° F. and 700° F.

In the first catalyst, the temperatures are preferably maintained at the lowest possible temperature within the contemplated range, e. g. 460° F. It is, however, necessary to gradually raise the temperature in the first catalytic zone as the catalyst continues in use apparently due to a gradual decline in the catalytic activity. Optimum catalyst life results from maintaining the temperature as low as possible within the contemplated range.

Maintenance of the requisite temperatures in this embodiment is achieved by well-recognized heat transfer techniques, for example, by jacketing the reactor with a suitable heat transfer medium.

The following example illustrates the manner in which the present invention may be conducted employing relatively small quantities of chlorine:

EXAMPLE I

The individual reactors in these experiments consisted of two 2 inch diameter nickel pipes, 5 feet 6 inches long, connected to form a U-shaped section. Two such reactors were connected in series. Each was jacketed with an 8 inch section of steel pipe filled with Dowtherm and electrically heated with resistant wires.

Nine pounds of catalyst containing 30 percent barium chloride by weight provided by impregnating 6–8 mesh activated carbon with barium chloride was used. Both tetrachloroethane and chlorine were vaporized by introduction into a steam-jacketed, one-half inch pipe three feet long. The resulting gaseous mixture was then introduced via a steam-jacketed pipe to the inlet end of the first reactor. The respective quantities of tetrachloroethane and chlorine so introduced are given below in Table I.

This gas stream initially containing tetrachloroethane and chlorine was introduced and passed through the first reactor and thence through the second catalyst-containing reactor. The gases discharged from the second reactor were collected, appropriately cooled, stripped of hydrochloric acid and analyzed. The removal of the HCl was effected by the use of a shower pipe and stripper.

The composition of the gas stream leaving the first reactor was determined by removing a sample from the emerging stream, condensing and subjecting it to infraanalysis. No detectable chlorine was found in such samples.

The following table gives the respective reaction conditions and results:

Table I
TWO REACTORS

| After Reactor | Temperature | Weight Percent of Organics | | | | | | Feed, Pounds/hour | |
|---|---|---|---|---|---|---|---|---|---|
| | | $C_2HCl_3$ | $C_2Cl_4$ | $C_2H_2Cl_4$ | $C_2HCl_5$ | $C_2Cl_6$ | $C_4Cl_6$ and $C_6Cl_6$ | Tetrachloroethane | $Cl_2$ |
| 1 | 490 | 67.8 | 23.5 | 8.6 | 0 | 0 | 0 | 16 | 1.5 |
| 2 | 600 | 70.6 | 26.1 | 3.1 | 0.2 | 0 | 0 | | |
| 1 | 490 | 71.1 | 26.3 | 2.5 | 0.1 | 0 | 0 | 16 | 1.5 |
| 2 | 630 | 71.6 | 26.5 | 1.7 | 0.2 | 0.04 | 0 | | |
| 1 | 530 | 60.3 | 26.7 | 10.6 | 0.59 | 1.62 | 0.12 | 16 | 1.5 |
| 2 | 670 | 62.4 | 28.2 | 7.54 | 0.72 | 0.96 | 0.09 | | |

In processes utilizing more than 0.4 mole of chlorine per mole of tetrachloroethane, somewhat different conditions are preferred. When between 0.4 and 1.0 mole of chlorine per mole of tetrachloroethane, or possibly somewhat larger amounts of chlorine, are employed the exothermic portion of the overall reaction which is conducted in the first catalyst bed is usually sufficient to support the necessary dehydrochlorination reaction in that bed. Introduction of heat into the first catalyst zone, other than to initiate the reaction during its commencement, is not usually necessary.

In the high feed chlorine processes comprising a particular embodiment of this invention, the temperature of the first catalytic bed is maintained between 450° F. and 650° F. while the second catalyst bed is maintained at a substantially cooler temperature in the range of from 400° F. to 500° F. At optimum, the temperature in the second reactor is between 30° F. and 130° F. cooler than the temperature in the first catalyst bed.

Since, sufficient chlorine is frequently present in this embodiment to generate a large quantity of heat by virtue of the exothermic additive chlorination reaction, it has been found advantageous in accordance with a preferred embodiment of this invention, to control the maximum temperature in the first catalyst bed by the removal of heat. This may be accomplished by suitably jacketing the reactor with an appropriate heat transfer medium maintained at a temperature cooler than that within the reactor. Usually, Dowtherm or other such commercial heat transfer medium is suitable for cooling purposes within this temperature range and by maintaining the coolant at a temperature within the range, the reactor temperature itself may be reasonably well controlled.

It has further been found that another advantage accrues when the temperature in the first reactor is not permitted to substantially exceed 650° F., and preferably is limited to 600° F. Thus, it has been discovered that when the temperature is permitted to rise substantially above 650° F., an unusually high concentration of hexachloroethane is present in the final product. Apparently, at temperatures above 650° F. and in the presence of substantial quantities of chlorine, perchloroethylene reacts with said chlorine to provide the hexachloroethane at a rate which is substantial.

The following example illustrates the invention employing the larger concentrations of chlorine in the feed mixture:

EXAMPLE II

Following the procedure outlined in Example I, and using the same apparatus, the following runs were conducted with Table II tabulating the data:

rated catalytic beds, it is possible to use but one catalyst bed by effecting the consumption of chlorine in a localized section thereof along the line of flow of the gaseous mixture through the bed. Particularly in connection with those processes employing from 0.4 to 1.0 mole of chlorine per mole of tetrachloroethane, this may be accomplished by establishing along the line of flow of the gaseous stream a pair of different temperature zones in the bed.

Thus, according to another embodiment of this invention, a gaseous mixture of chlorine and tetrachloroethane in the appropriate proportions are brought into contact with a dehydrochlorination catalyst bed having an elevated temperature between 450° F. to 650° F. wherein substantially all of the chlorine is consumed. The resulting gas stream, substantially free of chlorine, then is conducted through a further portion of the catalytic bed which is maintained at a substantially cooler temperature in the range of 400° F. to 550° F., and between 30° F. and 110° F. cooler than said elevated temperature portion of the bed. In this manner a plurality of catalyst beds are in effect provided which permit performance of the present invention. A gaseous mixture initially containing chlorine and tetrachloroethane is thereby passed into an initial reaction wherein essentially complete consumption of the charged chlorine occurs and thereafter, without returning chlorine-free gases to the first zone, contacting a catalyst bed under conditions which promote dehydrochlorination with the chlorine-free gas.

The effective use of a two temperature zone catalyst bed in conjunction with the present invention is achieved by recourse to an elongated tubular catalyst bed such as already described through which the gaseous materials are passed in a continuously moving line of flow. Thus, a gaseous mixture of tetrachloroethane and chlorine is introduced into the inlet end of the elongated reactor, passed through a "hot" zone and thence downstream from said "hot" zone along the line of flow, through a "cool" zone.

It is recommended practice to control carefully the temperature in respective portions of the catalyst bed to obtain and maintain the requisite "hot" and "cool" zones in the appropriate sequence. Maintenance of the "hot" zones within the appropriate temperature range necessitates the removal of heat, firstly to prevent unduly high temperatures and secondly to localize the extent of the "hot" zone along the line of flow of the reactants. Downstream, establishment of the "cool" zone requires the introduction of heat. As already discussed, this may be achieved by appropriately jacketing the respective portions of the tubular reactor.

*Table II*

TWO REACTORS

| Leaving Reactor | ° F. Maximum Temperature | Weight Percent of Organics | | | | | | Feed, Pounds/hour | |
|---|---|---|---|---|---|---|---|---|---|
| | | $C_2HCl_3$ | $C_2Cl_4$ | $C_2H_2Cl_4$ | $C_2HCl_5$ | $C_2Cl_6$ | $C_4Cl_6$ and $C_6Cl_6$ | Tetrachloroethane | $Cl_2$ |
| 1 | 600 | 32.9 | 43.3 | 11.1 | 2.4 | 9.82 | 0.19 | 14 | 3.5 |
| 2 | 490 | 35.0 | 64.1 | 0.49 | 0.16 | 0 | 0.19 | | |
| 1 | 590 | 27.9 | 33.6 | 17.2 | 4.1 | 17.0 | 0.12 | 14 | 3.5 |
| 2 | 490 | 36.9 | 53.3 | 0.46 | 0.70 | 8.6 | 0.12 | | |
| 1 | 620 | 24.3 | 21.2 | 24.9 | 1.93 | 27.7 | 0 | 14 | 3.5 |
| 2 | 490 | 42.3 | 47.9 | 0.37 | 0.76 | 8.47 | 0.14 | | |
| 1 | 560–600 | 23.6 | 25.7 | 22.2 | 4.98 | 23.6 | 0 | 14 | 3.5 |
| 2 | 490 | 33.1 | 60.1 | 0.28 | 0.87 | 5.41 | 0.21 | | |
| 1 | 550 | 22.1 | 52.8 | 17.1 | 3.35 | 4.62 | 0 | 14 | 3.5 |
| 2 | 490 | 31.5 | 67.2 | 0.39 | 0.24 | 0.59 | 0 | | |

While the invention has heretofore been described in connection with the utilization of two physically sepa- According to a further preferred embodiment of this invention, the maintenance and control of the respective "hot" and "cool" zones may be achieved by transferring the excess heat from the "hot" zone downstream to the "cool" zone such that the heat evolved by the exothermic portions of the reaction in the "hot" zone is utilized to at least partially maintain the dehydrochlorination reactions occurring in the "cool" zone.

The following examples illustrate the manner in which a unitary catalyst bed may be in effect operated as a duo-catalytic bed in accordance with a particular embodiment of this invention:

EXAMPLE III

The reactor comprised a 2 inch diameter nickel tube 6 feet long concentrically surrounded by a steel jacket 3 inches in diameter and 5 feet long, leaving unjacketed 6 inches of the tube on each end. At the center and on the bottom of the jacket 2 inch pipe nipple was connected to a steel pipe 5 feet long and 2 inches in diameter, disposed in parallel with the reactor and jacket. This steel pipe served as a vaporizer for the Dowtherm A heat transfer medium employed in the jacket. Two layers of asbestos paper were wrapped around the ends of the jacket. Each paper was then wrapped with 40 feet of 0.52 ohm Nichrome wire to which variable resistors were connected. The entire unit was then placed in a galvanized sheet metal shell 6 feet long and 12 inches in diameter filled with finely divided, hydrated silica sold under the trade name of Hi-Sil by Columbia-Southern Chemical Corporation.

The feed system consisted of a steel jacketed, vertically disposed nickel pipe 3 feet long and 1 inch in diameter. Steam at 130 pounds per square inch gauge was fed to the upper portion of the vaporizer connected to the inlet end of the reactor.

The outlet end of the reactor was connected to a reactor sump wrapped with 30 feet of 0.52 ohm Nichrome wire on asbestos paper and heated via the wire and a variable resistor.

The reactor sump was in turn connected to a shower pipe composed of a nickel pipe 4 inches in diameter and 18 inches long filled with ¼ inch Berl saddles supported on a perforated nickel plate. Liquid organic products were withdrawn from the bottom of the shower pipe while gaseous hydrogen chloride escaped to a cooling and absorbing system where it was dissolved in water.

The reactor was filled with barium chloride impregnated porous carbon (6–8 mesh) containing 30 percent by weight barium chloride. Berl saddles were placed in each unjacketed end (six inches on each side) providing a 5 foot bed of catalyst having a volume of 0.117 cubic foot.

Ten thermocouples were disposed along the length of the reactor starting at nine inches from the inlet end of the tube, and thereafter being spaced at six inch intervals for recordation of the temperature in the center of the catalyst bed.

In operation, tetrachloroethane and chlorine in the amounts indicated in Table III were fed to the vaporizer and thence to the reactor. The resulting gaseous product emanating from the reactor was cooled by contact with already liquefied product in the shower pipe to condense the product and leave gaseous hydrogen chloride. The product was thereafter analyzed for its composition, given in Table III.

Dowtherm A in the jacket was maintained at a temperature of 500° F. to remove and introduce heat as needed along the bed and to maintain the requisite temperature zones.

Each run in Table III represents several hours of operation and the data where applicable are steady state conditions.

Table III summarily describes the operational conditions and results:

*Table III*

| Run | 1 | 2 | 3 | 4 | 5 | 6 | 7 | 8 |
|---|---|---|---|---|---|---|---|---|
| Reactor Temp., ° F.: | | | | | | | | |
| Hot Zone | 515 | 530 | 490 | 485 | 500 | 500 | 515 | 540 |
| Cool Zone | 445 | 450 | 445 | 445 | 455 | 460 | 460 | 450 |
| Dowtherm | 500 | 500 | 500 | 500 | 500 | 500 | 500 | 500 |
| Feed 1,1,2,2 $Ch_2H_2Cl_4$, #/hr | 10 | 10 | 10 | 8.0 | 6.0 | 6.0 | 6.0 | 6.0 |
| Feed Chlorine, #/hr | 1.25 | 2.5 | 1.5 | 1.0 | 1.0 | 1.0 | 1.0 | 1.5 |
| Product Crude, #/hr | 8.0 | 10.0 | 8.5 | 7.5 | 5.3 | 5.0 | 5.3 | 5.0 |
| Retention Time: sec | 9.0 | 7.4 | 8.6 | 11.3 | 14.0 | 14.0 | 14.0 | 12.2 |
| Product Analysis: Mol percent: | | | | | | | | |
| Trichloroethylene | 50.0 | 42.6 | 52.5 | 58.5 | 52.6 | 52.2 | 48.2 | 40.4 |
| Perchloroethylene | 28.8 | 44.0 | 26.7 | 20.7 | 37.2 | 40.4 | 44.8 | 53.1 |
| Tetrachloroethane | 18.5 | 7.4 | 17.5 | 18.0 | 7.9 | 5.2 | 5.4 | 4.7 |
| Pentachloroethane | 1.4 | 0.5 | 1.7 | 1.1 | 0.7 | 0.7 | 0.7 | 0.7 |
| Hexachloroethane | 0.7 | 3.4 | 0.9 | 0.6 | 0.7 | 0.9 | 0.1 | 0.2 |
| Hexachlorobutadiene | 0.7 | 2.2 | 0.6 | 0.8 | 0.9 | 0.6 | 0.7 | 0.8 |
| Hexachlorobenzene | 0.0 | 0.0 | 0.1 | 0.2 | 0.1 | 0.1 | 0.2 | 0.2 |

EXAMPLE IV

The apparatus in these experiments included a vaporizer, a jacketed reactor and recovery apparatus.

The vaporizer comprised a vertically disposed 3 foot section of 1½ inch diameter pipe jacketed with steam at 130 pounds per square inch. Tetrachloroethane and chlorine were vaporized by introduction into the upper portion and vaporized at a temperature of about 280° F.

The vaporized tetrachloroethane and chlorine then were passed through a preheater consisting of a 3 foot length of 2 inch diameter nickel pipe wound with resistance wire as a source of heat and into the reactor at a temperature of about 420° F.

A pair of nickel pipes 2 inches in diameter and 5 feet 6 inches long connected at one end in series as a U-shaped reaction zone constituted the reactor. The two pipes were enclosed in a steel pipe 8 inches in diameter filled with Dowtherm A. The jacket was wound with resistance wire connected to a variable resistance for heating the Dowtherm.

The reactor was filled with barium chloride-impregnated activated carbon of 6 to 8 mesh containing 30 percent by weight barium chloride. After filling the reactor, the effective length for each section was 5 feet 2 inches, providing a total of 10 feet 4 inches of catalytic bed.

The gases emanating from the reactor were discharged into a 14 inch length of 4 inch diameter nickel pipe, partially filled with boiling crude reaction products.

Above this unit was a 2 foot section of nickel pipe 4 inches in diameter packed with ¼ inch Berl saddles which served as a shower pipe. Liquid product was passed down through the shower pipe to condense the gases emanating from the reactor.

A heat exchanger was mounted above the shower pipe. Uncondensed gases from the reactor mainly constituting hydrogen chloride passed upwardly through this heat exchanger which was cooled with 0° F. brine. From there the hydrogen chloride was further cooled, purified and absorbed in water to provide hydrochloric acid.

Each reactor tube was equipped with 10 thermocouples uniformly distributed along the line of flow of gases in the catalyst bed and capable of being independently read. The temperatures obtained were for the center of the catalyst bed. This permitted essentially constant readings of the various temperatures in the reactor and location of the high temperature zone.

Table IV below summarizes the operational conditions and results after steady state conditions were obtained and for about three hours:

Table IV

| Run | Feed | | Hot Zone Location, Inches Into Reactor | Hot Zone Temp., °F. | Cool Zone³ Reactor Temp., °F. | Dowtherm Temp., °F. | Crude Pounds Per Hr. Average | Retention Time, Seconds | Crude Composition, Weight Percent | | | | | | |
|---|---|---|---|---|---|---|---|---|---|---|---|---|---|---|---|
| | Pounds Per Hr. C₂H₂Cl₄ | Pounds Per Hr. Cl₂ | | | | | | | C₂HCl₃ | C₂Cl₄ | C₂H₂Cl₄ | C₂HCl₅ | C₂Cl₆ | C₄Cl₆ | C₆Cl₆ |
| B¹ | 8 | 2 | 2 | 515 | 465 | 479 | 8 | 15.5 | 32.4 | 67.0 | 0.27 | 0.15 | 0.00 | 0.18 | 0.00 |
| A¹ | 12 | 3 | 8 | 502 | 470 | 476 | 11 | 10.3 | 34.8 | 64.2 | 0.49 | 0.26 | 0.18 | 0.18 | 0.00 |
| C¹ | 16 | 4 | 14 | 517 | 460 | 477 | 14 | 7.9 | 31.1 | 67.7 | 0.53 | 0.18 | 0.30 | 0.14 | 0.00 |
| D¹ | 20 | 5 | 20 | 530 | 460 | 475 | 17 | 6.3 | 31.9 | 65.2 | 1.13 | 0.34 | 1.29 | 0.18 | 0.02 |
| E₂ | 24 | 6 | 20 | 560 | 458 | 475 | 20 | 5.2 | 30.9 | 63.9 | 1.7 | 0.60 | 2.7 | 0.15 | 0.02 |
| F₂ | 28 | 7 | 20 | 553 | 458 | 475 | 23 | 4.5 | 27.6 | 65.3 | 3.0 | 0.76 | 3.16 | 0.51 | 0.03 |

¹ Reactor horizontal. ² Reactor vertical. ³ Essentially constant for the entire downstream portion following the hot zone.

Withdrawn from the reaction is a gaseous mixture of materials which are predominately perchloroethylene and/or trichloroethylene. As already explained, the relative concentration of these two products is dependent upon the feed ratio of chlorine to tetrachloroethane. Besides these two organic products, considerable hydrogen chloride is evolved, about one mole of hydrogen chloride being generated for each mole of trichloroethylene produced and two moles of hydrogen chloride being provided for each mole of perchloroethylene produced.

Other chlorinated hydrocarbons are also present in varying but lesser proportions. Exit gases from the reaction system contain one or more of pentachloroethane, hexachloroethane, hexachlorobutadiene, and hexachlorobenzene as well as possibly some of the lower chlorinated derivatives of acetylene such as acetylene dichloride. Under ideal conditions, these materials should individually constitute less than about 1 percent by weight and most frequently on the order of less than 0.5 percent by weight of the organics.

Tetrachloroethane, in minor proportions, may also be present in the reaction product. For the most part, when the second catalytic bed is operated under suitable conditions, such as between 400° F. and 550° F. and a contact time of about at least 6 seconds, the concentration of tetrachloroethane is kept at a minimum or effectively obviated.

After leaving the second or last catalyst bed, the organic constituents of the stream are selectively condensed by cooling, leaving the hydrogen chloride in the vapor state. Usually, cooling to at least about 180° F., and more preferably to at least 70° F., but above the boiling point of hydrogen chloride suffices to effect this separation of hydrogen chloride from the organics. Thereafter, the remaining liquid organic phase is resolved into its respective components, or into any desired composition by recourse to fractional distillation techniques.

Although the present invention has been described by reference to specific details of certain embodiments, it is not intended that the invention be regarded as limited thereto except insofar as they are included in the appended claims.

We claim:

1. A method of preparing an olefinically unsaturated chlorinated hydrocarbon containing two carbon atoms which comprises establishing at least two dehydrochlorination catalyst zones in series, passing a gaseous mixture initially containing chlorine and tetrachloroethane in a continuously forward moving stream into contact with the first of said zones, substantially completely consuming the chlorine in said first zone, thence passing the stream through the second of said dehydrochlorination catalyst zones while preventing substantial return flow of reaction mixture in the second zone to said first zone.

2. A method of preparing a compound selected from the group consisting of trichloroethylene and perchloroethylene which comprises establishing at least two zones of dehydrochlorination catalysts in series, passing a gaseous mixture initially containing chlorine and tetrachloroethane as a continuously forward moving stream, into contact with the first of said zones, substantially completely consuming the chlorine therein, and thereafter passing the stream into contact with a second dehydrochlorination catalyst zone while preventing substantial return flow of the reaction mixture in said second zone to said first zone.

3. The method of preparing a compound selected from the group consisting of trichloroethylene and perchloroethylene which comprises establishing a pair of dehydrochlorination catalyst zones in series, passing a gaseous mixture initially containing chlorine and tetrachloroethane as a continuously forward moving stream into contact with the first of said zones, maintaining said first zone at from 400° F. to 700° F., consuming substantially all of the chlorine in said first zone, and thereafter passing said stream through a second dehydrochlorination catalyst zone maintained at from 400° to 700° F., while preventing substantial return flow of the reaction mixture in said second zone to said first zone.

4. A method of preparing a compound selected from the group consisting of perchloroethylene and trichloroethylene which comprises establishing at least two dehydrochlorination catalyst zones in series, passing a continuously forward moving stream initially containing chlorine and tetrachloroethane into contact with the first of said zones, consuming essentially all of the chlorine in the first zone, and passing the stream issuing from the first zone containing perchloroethylene and at least one dehydrochlorinatable chlorinated hydrocarbon into contact with said second zone, while preventing return flow of the perchloroethylene-containing stream to said first reactor.

5. The method which comprises subjecting a gaseous mixture initially containing tetrachloroethane and chlorine in the presence of a dehydrochlorination catalyst, first to a controlled, elevated temperature up to 700° F. and then to a temperature which is between 30° F. and 130° F. cooler than the first temperature but above 400° F.

6. The method which comprises subjecting a gaseous mixture initially containing tetrachloroethane and chlorine in the presence of a dehydrochlorination catalyst first to a temperature of from 450° F. to 650° F. and then to a substantially cooler temperature which is between 400° F. and 550° F.

7. The method which comprises subjecting a gaseous mixture initially containing tetrachloroethane and chlorine in the presence of a dehydrochlorination catalyst first to a temperature of between 450° F. and 650° F. and then to a temperature which is 30° F. to 110° F. cooler and between 400° F. and 550° F., the retention time at the cooler temperature being at least 6 seconds.

8. A method for producing trichloroethylene and perchloroethylene from tetrachloroethane and chlorine which comprises passing gaseous tetrachloroethane and chlorine into contact with a dehydrochlorination catalyst maintained at a temperature of between 450° F. and 650° F. and thereafter passing the resulting gaseous mixture into contact with a dehydrochlorination catalyst at a temperature of from 400° F. to 550° F. and between 30° and 110° F. cooler than the initial contact temperature.

9. The method which comprises providing a porous bed of dehydrochlorination catalyst having inlet and outlet ends, establishing a hot temperature zone and a cool temperature zone in said bed, the cool zone being between the hot zone and outlet end, maintaining the hot zone at between 450° F. and 650° F. and maintaining the cool zone at between 400° F. and 550° F. but below the temperature of the hot zone, passing a gaseous mixture of tetrachloroethane and chlorine into the inlet end of said bed whereby to establish a continuously forward moving gas stream flowing sequentially through the hot zone and the cool zone.

10. The method which comprises providing a porous bed of dehydrochlorination catalyst having an inlet and outlet end, establishing a hot zone and a cool zone in said bed, the cool zone being between the hot zone and outlet end, maintaining the hot zone at between 450° F. and 650° F. and maintaining the cool zone below the temperature of the hot zone and between 400° F. and 550° F. passing a gaseous mixture of tetrachloroethane and chlorine containing between about 0.4 and 1.0 mole of chlorine per mole of tetrachloroethane into the inlet end of said bed whereby to establish a gaseous stream flowing sequentially through the hot zone and thence the cool zone and removing perchloroethylene from said outlet end.

11. The method which comprises providing a porous bed of dehydrochlorination catalyst having inlet and outlet ends, establishing a hot zone and a cool zone in said bed, said cool zone being between the hot zone and outlet end, maintaining the hot zone at between 450° F. and 650° F. and maintaining the cool zone at a temperature between 30° F. to 110° F. cooler than the hot zone and at a temperature between 400° F. and 550° F., passing a gaseous mixture of tetrachloroethane and chlorine into the inlet end of said bed whereby to establish a gaseous stream flowing sequentially through the hot zone and thence the cold zone of said bed, said gaseous mixture containing between about 0.4 and 1.0 mole of chlorine per mole of tetrachloroethane, providing a retention time of the gas stream in the cool zone of at least 6 seconds, and removing product from said outlet end.

12. The method which comprises introducing a gaseous mixture of tetrachloroethane and chlorine into the inlet end of an elongated tubular reactor having a diameter of less than 3 inches and filled with porous dehydrochlorination catalyst whereby to provide a flowing gaseous stream along the length of said reactor, maintaining in sequence along the line of flow through said reactor a hot zone and a cool zone, said hot zone being between 450° F. and 650° F. and said cool zone being between 30° F. and 110° F. cooler than the hot zone and between 400° F. and 550° F. providing a retention time of the gas stream in said cool zone of at least 6 seconds and removing gaseous product from the outlet end of the reactor.

13. The method which comprises introducing a gaseous mixture of tetrachloroethane and chlorine into the inlet end of an elongated tubular reactor filled with porous dehydrochlorination catalyst whereby to provide a stream of gaseous materials flowing along the length of said reactor, maintaining a hot zone and a cool zone in the reactor along the line of flow of said gases by removing heat from said hot zone and adding heat to said cool zone thereby controlling the temperature of said hot zone to between 450° F. and 650° F. and also maintaining the cool zone temperature at between 30° F. to 110° F. cooler than said hot zone and between 400° F. to 550° F. and removing gaseous product from the outlet end of said tubular reactor.

14. The method of claim 13 wherein the gaseous mixture of tetrachloroethane and chlorine contains between about 0.4 and 1.0 moles of chlorine per mole of tetrachloroethane and wherein the gaseous product contains trichloroethylene and perchloroethylene.

15. A method of preparing perchloroethylene which comprises passing a gaseous mixture of chlorine and tetrachloroethane containing up to about one mole of chlorine per mole of tetrachloroethane through a plurality of reaction zones containing dehydrochlorination catalyst at elevated dehydrochlorination temperatures, effecting both dehydrochlorination of the tetrachloroethane to produce trichloroethylene and chlorine addition to the resulting trichloroethylene to the extent that substantially all of the feed chlorine is consumed in the first of said zones, effecting dehydrochlorination of residual tetrachloroethane in a second zone in the essential absence of feed chlorine and preventing substantial flow from the second zone to the first zone.

16. The method according to claim 1 wherein the dehydrochlorination catalyst zones are elongated zones having a maximum cross sectional diameter of about 3 inches.

17. The method according to claim 1 wherein the dehydrochlorination catalyst zones have a maximum cross sectional diameter of about 3 inches and each zone is at least 3 feet in length along the line of gas flow.

References Cited in the file of this patent

UNITED STATES PATENTS

| | | |
|---|---|---|
| 2,139,219 | Basel et al. | Dec. 6, 1938 |
| 2,361,072 | Vining | Oct. 24, 1944 |
| 2,538,723 | Fruwirth et al. | Jan. 16, 1951 |
| 2,547,139 | Randall | Apr. 3, 1951 |
| 2,610,215 | Vanharen | Sept. 9, 1952 |